US009586605B2

(12) United States Patent
He et al.

(10) Patent No.: US 9,586,605 B2
(45) Date of Patent: Mar. 7, 2017

(54) POWERED PALLET TRUCK

(71) Applicant: BIG LIFT, LLC., Lombard, IL (US)

(72) Inventors: Jinhui He, Hangzhou (CN); Lili Wu, Hangzhou (CN); Zhoujie Zhu, Hangzhou (CN); Linjie Xu, Hangzhou (CN); Qichen Ma, Hangzhou (CN)

(73) Assignee: BIG LIFT, LLC, Lombard, IL (US)

( * ) Notice: Subject to any disclaimer, the term of this patent is extended or adjusted under 35 U.S.C. 154(b) by 389 days.

(21) Appl. No.: 14/055,071

(22) Filed: Oct. 16, 2013

(65) Prior Publication Data

US 2015/0102274 A1    Apr. 16, 2015

(51) Int. Cl.
| | |
|---|---|
| *B62B 5/00* | (2006.01) |
| *B62B 3/06* | (2006.01) |
| *B66F 9/075* | (2006.01) |
| *B66F 9/08* | (2006.01) |

(52) U.S. Cl.
CPC .......... *B62B 3/0618* (2013.01); *B62B 3/0612* (2013.01); *B62B 5/0043* (2013.01); *B66F 9/0755* (2013.01); *B66F 9/08* (2013.01)

(58) Field of Classification Search
CPC .......... B66F 9/22; B66F 9/06; B66F 9/07504; B66F 9/07531; B66F 9/122; B66F 3/22; B66F 5/04; B62B 3/0612; B62B 3/0625; B62B 3/0606; B62B 3/0618
See application file for complete search history.

(56) References Cited

U.S. PATENT DOCUMENTS

| | | | |
|---|---|---|---|
| D136,279 S | 8/1943 | Holland et al. | |
| 2,592,091 A | 4/1952 | Weaver | |
| 3,043,388 A | 7/1962 | Hansen | |
| 3,249,170 A * | 5/1966 | Quayle | ................ B62B 3/0612 180/13 |
| 3,295,881 A | 1/1967 | Worthington | |
| 3,601,423 A | 8/1971 | Goodacre | |
| D222,670 S | 11/1971 | Goodacre | |
| 3,788,413 A * | 1/1974 | Miller | ................... B62B 5/023 180/8.2 |
| 3,854,748 A | 12/1974 | Goodacre | |
| D239,165 S | 3/1976 | Mono | |
| 4,047,698 A | 9/1977 | Ellis | |
| 4,065,012 A | 12/1977 | Rocco | |
| 4,096,961 A | 6/1978 | Rocco | |
| 4,103,795 A | 8/1978 | Miller | |
| 4,287,959 A | 9/1981 | Inman | |
| 4,577,463 A | 3/1986 | Kedem | |
| 4,615,533 A | 10/1986 | Sewell | |
| 5,113,960 A | 5/1992 | Prinz | |

(Continued)

OTHER PUBLICATIONS

Brochure for "PDS Power Drive Straddle Trucks" issued by Blue Giant®, Sep. 1, 2010 (2 pages).

(Continued)

*Primary Examiner* — Larry E Waggle, Jr.
*Assistant Examiner* — Seahee Yoon
(74) *Attorney, Agent, or Firm* — Cook Alex Ltd.

(57)  ABSTRACT

A powered pallet truck is provided having a base support portion and a load lift portion. The powered pallet truck has a lift cylinder device connected at a lower portion to a forward extending lift cylinder device seat on the base frame and pivotally connected at an upper portion within a recessed channel in the load lift frame.

19 Claims, 4 Drawing Sheets

(56) References Cited

U.S. PATENT DOCUMENTS

| | | | |
|---|---|---|---|
| D343,935 S | 2/1994 | Drobeck et al. | |
| 5,618,154 A | 4/1997 | Irons et al. | |
| 5,752,584 A | 5/1998 | Magolo et al. | |
| D408,958 S | 4/1999 | Schneider | |
| 6,125,971 A | 10/2000 | Niebuhr et al. | |
| 6,260,646 B1 | 7/2001 | Fernandez et al. | |
| D447,612 S | 9/2001 | Niebuhr | |
| D464,785 S | 10/2002 | Gallagher | |
| 7,040,427 B2 | 5/2006 | Toomey | |
| D530,878 S | 10/2006 | Ruppert et al. | |
| D542,004 S | 5/2007 | Righi | |
| D559,498 S | 1/2008 | Ruppert et al. | |
| D562,525 S | 2/2008 | Graf et al. | |
| D565,270 S | 3/2008 | Ruppert et al. | |
| D583,124 S | 12/2008 | Stark | |
| 7,641,011 B2 * | 1/2010 | Fridlington, Jr. | B62B 3/0618 180/68.5 |
| 7,744,335 B1 | 6/2010 | Cleary | |
| D655,064 S | 2/2012 | Knie | |
| 8,230,976 B2 | 7/2012 | Baldini | |
| 8,246,008 B2 | 8/2012 | De Jong et al. | |
| D674,982 S | 1/2013 | Babel et al. | |
| 8,360,443 B2 | 1/2013 | Ellington | |
| 8,540,213 B2 * | 9/2013 | Feiquan | B66F 9/065 254/2 C |
| D692,202 S | 10/2013 | Feiquan et al. | |
| D692,203 S | 10/2013 | Feiquan et al. | |
| D692,204 S | 10/2013 | Feiquan et al. | |
| 2005/0036880 A1 | 2/2005 | Magolo et al. | |
| 2006/0181039 A1 | 8/2006 | Fridlington, Jr. | |
| 2009/0260923 A1 | 10/2009 | Baldini | |

OTHER PUBLICATIONS

Website for Shanghai Noblelift Co. Ltd. Guangzhou Subsidiary "Semi-electric Pallet Truck Spt" http:/gdnobliften.en.busytrade.com/products/info/1904267/Semi-electric-Pallet-Truck-Spt.html, accessed Jan. 13, 2012, (4 pages).

Website for Stars for "ElecAric Vehicle—Electric Pallet Truck," http://www.starstw.com/news/stars-electric-pallet-truck.html, accessed Jan. 13, 2012 (1 page).

Website for Cherry's Industrial Equipment for "SPT15-Semi Electric Pallet Truck" http:/www.pallettruck.com/spt15.html, accessed Jan. 17, 2012 (1 Page).

E-P Equipment Co., Ltd.—Maximin Electric Pallet Truck EPT20-15ET photographs (1 page).

Brochure for "Walkie Pallet Trucks 4,000-5,000 lbs.", Model MPB040-E issued by Yale Materials Handling Corporation, 2006, (14 pages).

Three (3) color Photographs of the "Walkie Pallet Trucks 4,000-5,000 lbs.", Model MPB040-E by Yale Materials Handling Corporation.

* cited by examiner

POWERED PALLET TRUCK

FIELD OF THE INVENTION

The invention relates to industrial lift trucks and, in particular, pallet trucks for lifting and transporting pallets upon which goods may be placed.

BACKGROUND OF THE INVENTION

Pallet trucks are often used to lift and maneuver pallets and goods supported thereon during warehousing and shipping. Pallet trucks have been developed to provide varying amounts of functionality to an operator and may be generally categorized as either manual or powered. Manual pallet trucks typically have a frame with forks connected thereto, a truck supported on a pair of rear wheels, and a hydraulic jack connected to the truck and the frame. The jack, which is typically a hydraulic bottle jack, is operated by pivotally pumping a steering handle of the pallet truck up and down which causes the hydraulic bottle jack to raise the frame and the forks thereof off of the ground. Once the pallet has been raised by pumping the handle, an operator may steer the manual pallet truck by turning the handle relative to the truck. The handle is connected to the hydraulic bottle jack and the pair of rear wheels such that turning the handle generates concurrent turning of the hydraulic bottle jack and the pair of rear wheels. With the forks and pallet raised, the operator pushes or pulls on the handle with sufficient force to maneuver the manual pallet truck, the pallet, and the goods on the pallet to a desired location. As is apparent, maneuvering the pallet truck, the elevated pallet, and the goods thereon is even more difficult when the manual pallet truck is positioned on an inclined surface or within relatively tight confines, such as offloading pallets from a semi-truck trailer.

A powered pallet truck has a frame with forks connected thereto, a truck supported on a rear wheel, a hydraulic jack connected to the truck and the frame, and a drive mechanism connected to the rear wheel that assists the operator in maneuvering the pallet truck. Like the manual pallet truck, the powered pallet truck has a handle connected to the hydraulic jack and the rear wheel such that turning of the handle generates concurrent turning of the hydraulic jack and the drive wheel. However, the powered pallet truck has a drive mechanism, such as an electric motor, connected to the rear wheel that allows an operator to propel and brake the pallet truck by way of controls on the handle. This type of pallet truck may be referred to as a semi-powered pallet truck, as the operator still pivotally pumps the handle to activate the hydraulic jack and raise the frame and the forks thereof off the ground. An operator, such as an employee of a local delivery service, may make a large number of deliveries throughout a workday that each involve loading and unloading pallets and the goods thereon. Requiring the operator to manually pump the handle of the pallet truck each time they need to lift a pallet may be ergonomically difficult, particularly when the operator is attempting to move a pallet in limited working areas.

It is therefore desirable in some applications to provide a pallet truck having both a powered drive mechanism and a powered lift mechanism. Prior approaches for this type of pallet truck, which may be referred to as a fully-powered pallet truck, utilize a frame assembly comprising a large front frame having a pair of forks that moves up and down and a large rear frame to which the drive mechanism and lift mechanism are mounted that remains relatively stationary during up and down movement of the front frame.

For many prior fully-powered pallet trucks, the drive mechanism comprises an electric drive motor for propelling the pallet truck and the lift mechanism comprises a hydraulic pump and a hydraulic cylinder for moving the front frame up and down relative to the rear frame. By mounting the electric motor, the controller, the hydraulic pump, and the hydraulic cylinder to the generally stationary rear frame, wear and tear on the wiring and hoses associated with these components may occur during up and down movement of the front frame and forks thereof. One problem with this type of pallet truck, which is exacerbated with pallet trucks having higher load capacities is that the rear frame needs to be relatively large to support the drive mechanism, the lift mechanism, and their associated wiring, hoses, fittings, and the like. The rear frame also is commonly spaced behind the front frame and connected by straight links to control the relative motion of the front frame relative to the rear frame during lifting. Further, because the length of the forks of the pallet truck are generally fixed according to industry standards, providing a sufficiently large rear frame to support the drive mechanism, lift mechanism, their associated control and hydraulic components, and the spacing of the front and rear frames and use of straight links therebetween increases the overall length and width of the pallet truck.

Another problem with such prior fully-powered pallet trucks is that the configuration of the lift mechanism adds length to the rear frame and increases the overall length of the pallet truck. More specifically, the lift mechanism comprises one or more hydraulic cylinders mounted to the rear frame, forward of the drive motor and being configured to raise and lower the front frame. Positioning the one or more hydraulic cylinders forward of the drive motor adds to the length of the rear frame and increases the need to space the front frame well forward of the rear frame. The increased length and width inhibits maneuverability of such prior art fully-powered pallet trucks, which is especially disadvantageous in tight operating spaces.

SUMMARY OF THE INVENTION

In accordance with one aspect of the invention, a powered pallet truck is provided having a frame assembly including a base support portion, and a load lift portion having a pair of forks extending in a fore-and-aft direction from the load lift portion. The pallet truck has a drive wheel and a drive motor coupled to the drive wheel. The pallet truck further includes a lift mechanism operable for moving the load lift portion up and down relative to the base support portion. The lift mechanism includes a lift cylinder device that is mounted forward of the drive wheel and that is recessed within the load lift portion, reducing the length and width of the pallet truck.

The load lift portion of the frame may have an upstanding housing portion configured to receive one or more batteries with an integrated control module connected to a mounting plate. The mounting plate is connected to the upstanding housing portion above one or more batteries. In one form, the integrated control module includes a pressurized fluid supply mechanism, a battery charger and an electronic control system. The pressurized fluid supply mechanism includes a hydraulic pump and reservoir. The batteries are disposed in the bottom of containers of the upstanding housing and the position of the drive motor with transmission provides a configuration to lower the center of gravity of the pallet truck and increase the stability thereof during use.

In a preferred form, a load lift portion includes a power head to which the forks are connected and the pressurized fluid supply mechanism is connected. The power head has a longitudinal length and the forks may have a standard or specialized length. The base support portion is configured so that the mounting of the drive motor and lift mechanism keep the longitudinal length of the pallet truck to a minimum by permitting the base support portion and load lift portion to be very close to each other. In one example, the base support portion includes a steering seat to which a handle assembly is connected, and a drive wheel below the steering seat to which a drive motor is connected.

In accordance with another form of the invention, a powered pallet truck is provided that includes a frame assembly having a base support portion and a load lift portion with a pair of forks that extend forwardly. The base support portion includes a steering seat and a lift cylinder device seat separate from the steering seat. The pallet truck includes a steering assembly rotatably coupled to the steering seat and a lift cylinder device operable to move the load lift portion up and down relative to the base support portion. The pallet truck has a pivot connection between an upper portion of the lift cylinder device and the load lift portion. Further, the pallet truck has a connection between a lower portion of the lift cylinder device and the lift cylinder device seat of the base support portion configured so that the lower end portion and the lift cylinder device seat are fixed against longitudinal movement relative to each other.

In a preferred example, having the fluid connection to the lift cylinder device and the pressurized fluid supply mechanism move upward and downward together limits movement and stress for the fluid conduit therebetween. Also, by having separate steering and lift cylinder device seats, the lift cylinder device is not turned each time an operator turns the steering assembly to maneuver the pallet truck. This keeps the lift cylinder device from turning relative to the fluid conduit and reduces stresses otherwise imparted thereto. In this manner, the stresses imparted to the connections involving the hydraulic fluid are reduced and prolong the lifecycle of the components associated with the lift cylinder device and the pressurized fluid supply mechanism.

In one aspect, a powered pallet truck is provided that includes a base support portion having a base frame and a load lift portion having a load lift frame. The load lift portion further includes a pair of forks that extend forwardly. A drive wheel is rotatably connected to the base frame and a drive motor is coupled to the drive wheel. A lift mechanism is operable for moving the load lift portion and the forks thereof up and down relative to the base support portion. The lift mechanism further includes a lift cylinder device connected at a first portion to the base frame forward of the drive wheel. The lift cylinder device is pivotally connected at a second portion to the load lift frame and is recessed within the load lift frame, and a pressurized fluid supply mechanism is connected to the load lift frame and configured to supply pressurized fluid to the lift cylinder device.

In another aspect of the present invention, a powered pallet truck is provided that has a base support portion having a base frame and a load lift portion having a load lift frame, the load lift portion including a pair of forks that extend forwardly, and the base support portion including a steering seat, a drive wheel and a drive motor coupled to the drive wheel. The base frame further comprising a lift cylinder device seat. A steering assembly is rotatably coupled to the steering seat. A lift cylinder device having an upper portion and a lower portion is operable to move the load lift portion and the forks thereof up and down relative to the base support portion. There is a pivotal connection between an upper portion of the lift cylinder device and the load lift frame and a connection between the lower portion of the lift cylinder device and a lift cylinder device seat of the base frame at a location forward of the drive wheel and the steering seat, and at least partially recessed into a channel in the load lift frame.

It is to be understood that both the foregoing general description and the following detailed description are exemplary and provided for purposes of explanation only, and are not restrictive of the subject matter claimed. Further features and objects of the present disclosure will become more fully apparent in the following description of example embodiments and from the appended claims.

BRIEF DESCRIPTION OF THE DRAWINGS

In describing the preferred examples, reference is made to the accompanying drawing figures wherein like parts have like reference numerals, and wherein.

Figure 1:
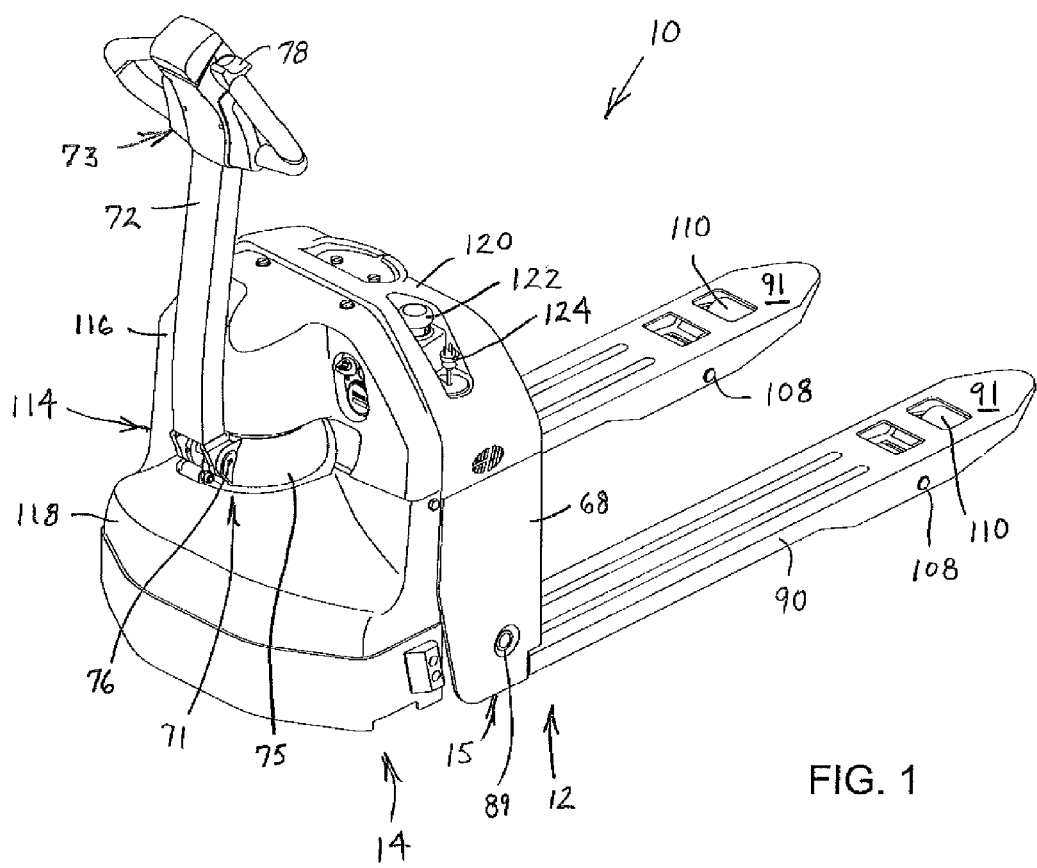
FIG. 1 is a perspective view of a powered pallet truck in accordance with the present invention.
Figure 2:
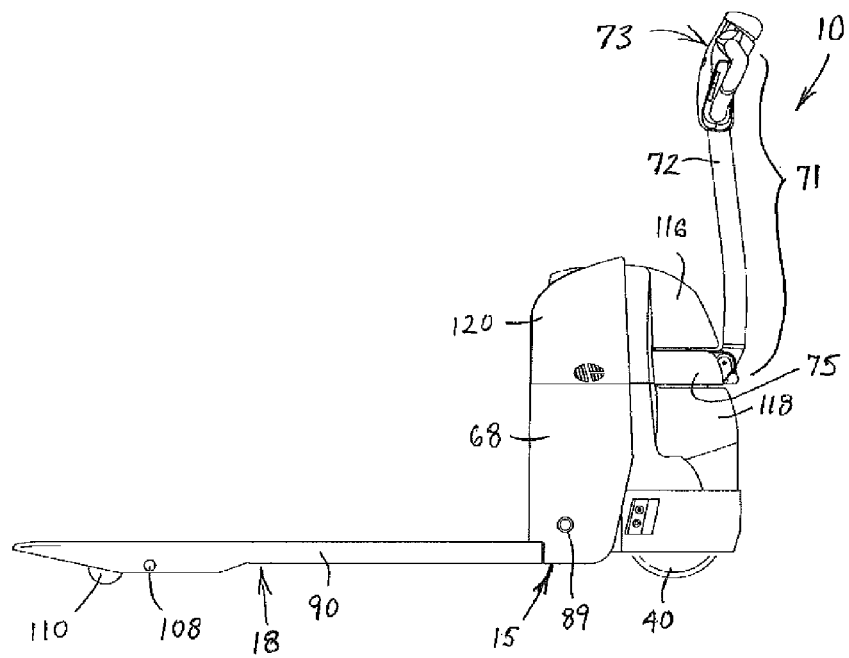
FIG. 2 is a side elevational view of the pallet truck of FIG. 1.
Figure 3:
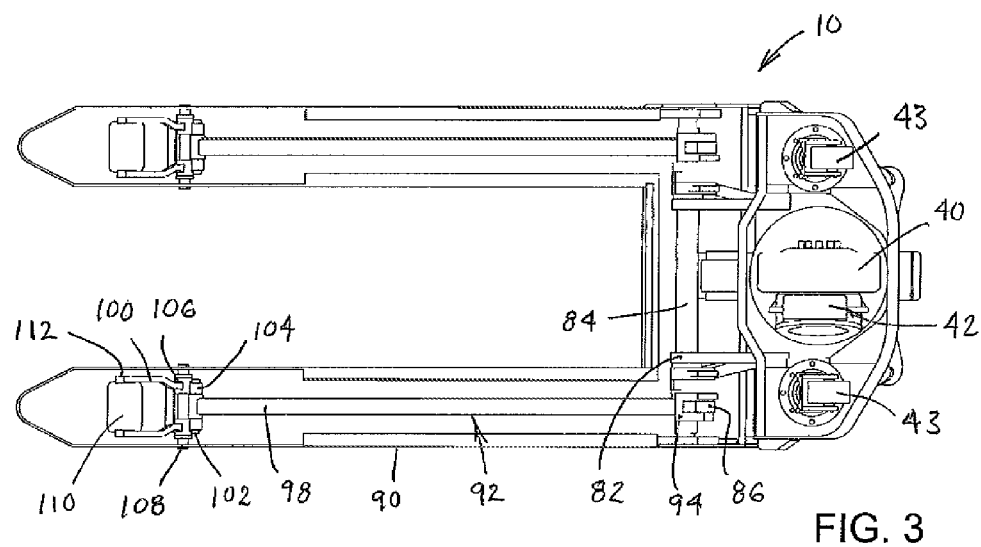
FIG. 3 is a bottom plan view of the pallet truck of FIG. 1.

It should be understood that the drawings are not to scale. While considerable mechanical details of powered pallet trucks, including details of fastening means and other plan and section views of the particular components, have been omitted, such details are considered within the comprehension of those skilled in the art in light of the present disclosure. It also should be understood that the present disclosure is not limited to the examples illustrated.

DETAILED DESCRIPTION OF THE PREFERRED EMBODIMENTS

Illustrated in FIGS. 1-7 is a pallet truck 10 in accordance with the present invention. The pallet truck 10 has a load lift portion 12 and a base support portion 14. The load lift portion 12 includes a power head 15 having a load lift frame 16 and forks 18 extending forwardly therefrom. The load lift portion 12 and its forks 18 move up and down relative to the base support portion 14 to lift pallets and goods positioned thereon. The base support portion 14 includes a base frame 20. A lift mechanism 24, such as a lift cylinder device 26, has its lower portion 28 connected to a lift cylinder device seat 30 that is configured as a plate that extends forward from the base frame 20. The lower portion 28 may be rigidly fixed to the lift cylinder device seat 30, such as by threaded fastener, or may be connected with a ball and socket joint that permits turning of the lower portion 28 of the lift cylinder device 26 but still restricts longitudinal relative movement.

The lift cylinder device 26 is received and disposed within a recessed channel 32 of the load lift frame 16. In this example, the channel 32 is formed with spaced apart, opposed side walls 34 that are substantially vertically oriented, extend fore and aft, and are connected to a rear plate 35, such as by welding or other suitable means of connection. The lift cylinder device 26 is connected at an upper portion 36 to the opposed side walls 34 of the channel 32 by a pivot pin 37. However, it will be appreciated that the pivot joint between the upper portion 36 and the load lift frame 16 could take other forms, such as a ball and socket joint. It also will be appreciated that throughout this disclosure reference to a pin is intended to refer to a conventional pin or to other structures that may be used to form pivotal joints, such as bolts, shafts, rods or other suitable structures.

Figure 4:
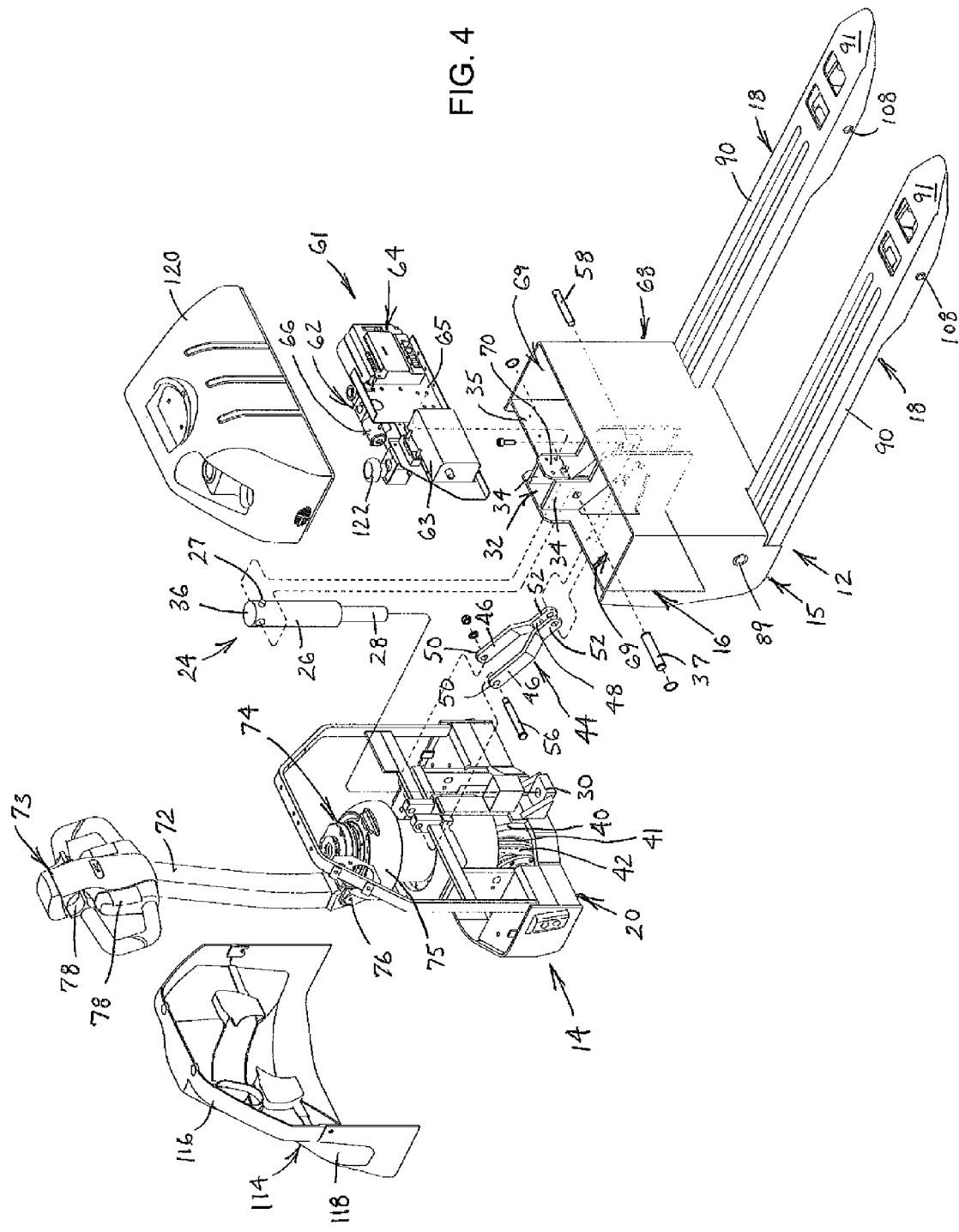
FIG. 4 is a side perspective partially exploded view of the pallet truck of FIG. 1 with a front cover and a rear cover of the pallet truck removed to show a lift cylinder and linkage.
Figure 7:
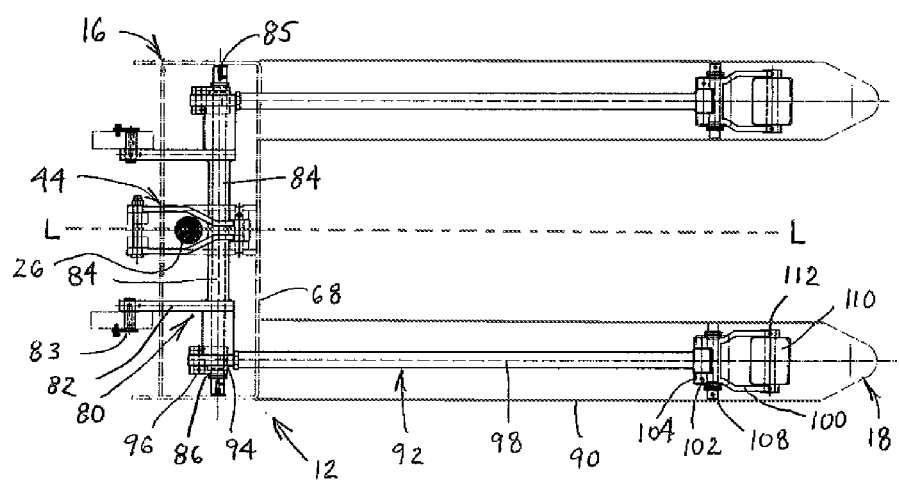
FIG. 7 is a bottom elevational view showing the linkages and front wheel lifting mechanism of the pallet truck of FIG. 1 when in the fully lowed position.

The base support portion 14 has a drive wheel 40 that is rotatably connected to the base frame 20 and is coupled to a drive motor 42. The drive motor 42 may be of a permanent magnet type, a brushless AC type, or other suitable alternatives. To enhance stability when subjected to shifting loads, the base support portion also includes a pair of caster wheels 43 that are spaced laterally from the drive wheel 40. The lift cylinder device 26 is connected to the load lift cylinder seat 30 forward of the drive wheel 40 and within the channel 32 that is recessed within the load lift frame 16. As seen in FIG. 7, the lift cylinder device 26 has a longitudinal axis aligned with a central longitudinal axis LL of the load lift frame 16. In this example, as seen in FIG. 4, a transmission 41 is connected to the drive motor 42 and drive wheel 40, although alternative configurations to force rotation of the drive wheel 40 may be utilized. The example configuration allows the power head 15 and its load lift frame 16 to be located immediately forward of the base support portion 14, instead of being significantly spaced apart from the base support portion 14 to accommodate the width of a lift mechanism being located therebetween.

The pallet truck 10 includes an upper link assembly 44. The upper link assembly 44 includes a pair of laterally offset links 46. In this example, the laterally offset links 46 are connected by a bridge 48, resulting in a generally Y-shaped configuration having the offset links 46 spaced apart further at their upper end 50 than at their lower end 52. The upper end 50 of the links 46 are pivotally connected by a pivot pin 54 to spaced apart, opposed flanges 56 that are substantially vertically oriented, extend fore and aft, and are connected to the base frame 20, such as by welding or other suitable means of connection. The lower end 52 of the offset links 46 are pivotally connected by a pivot pin 58 connected to pivot blocks 60 that are fixedly connected to the spaced apart, opposed side walls 34 of the load lift frame 16.

The lift cylinder device 26 is received in the space between the links 46 toward the wider spaced upper ends 50 of the upper link assembly 44. Thus, the recessed channel 32 and the upper link assembly 44 permit the close positioning of the load lift frame 16 and the base frame 20. This configuration of the lift cylinder 26 effectively being connected to and supported by the base frame 20 while reaching forward and into a space within the load lift frame 16 of the power head 15 helps to minimize both the width and length of the pallet truck 10. The more compact configuration results in improved maneuverability of the pallet truck 10 in tight confines, such as unloading pallets from a semi-truck trailer or in narrow isle ways.

As may be seen in FIG. 4, the pallet truck 10 includes an integrated control module 61 that includes a pressurized fluid supply mechanism 62, a battery charger 63 and an electronic control system 64 that are connected to a mounting plate 65. The battery charger 63 may be a 110V AC plug-in automatic charging type, or other suitable alternative. The pressurized fluid supply mechanism 62 includes a hydraulic pump 66 and a reservoir 67 that are used to provide the pressurized fluid to operate the lift cylinder device 26 to move the load lift frame 16 and forks 18 thereof between a lowered position that may be seen in FIG. 5, and a raised position that may be seen in FIG. 6. The hydraulic pump 66 may include a permanent magnet motor or a suitable alternative drive mechanism. It will be understood that the pressurized fluid supply mechanism 62 is operably connected to the lift cylinder device 26 at a fitting 27 by a fluid conduit, which is not shown so as to permit better viewing of the upper link assembly 44. Providing pressurized fluid to the lift cylinder device 26 causes the piston or lower portion 28 of the lift cylinder device 26 to extend from the upper portion 36, thereby lifting the load lift portion 12 relative to the base support portion 14. Connecting the fluid conduit to the fitting 27 on the upper portion 36 of the lift cylinder device 26 causes the fluid conduit to move up and down with the integrated control module 61 and the fitting 27, which reduces stresses on the fluid conduit and its connections to the lift cylinder device 26 and the pressurized fluid supply mechanism 62. Moreover, in contrast to prior manual or semi-powered pallet trucks, the pressurized fluid supply mechanism 62 is configured to operate the lift cylinder device 26 without pivotal pumping of the handle assembly 72.

The power head 15 includes an upstanding housing 68 having battery containers 69 that hold batteries that provide a power source for the pallet truck 10. One or more batteries may be 24-volt 85 amp-hour absorbed glass mat maintenance-free batteries, or other suitable alternatives, and the batteries may be stacked within the battery containers 69. The batteries are not shown so as to permit better viewing of the channel 32 of the load lift frame 16. The mounting plate 65 of the integrated control module 61 is removably connected to the load lift frame 16 at a mounting bracket 70 that is fixed to the opposed side walls 35 of the channel 32, such as by welding or other suitable means of connection. The removable connection of the mounting plate 65 to the mounting bracket 70 of the load lift frame 16 allows the pressurized fluid supply mechanism 62 and electronic control system 64 of the integrated control module 61 to be quickly, readily and simultaneously displaced, if needed, to access the batteries in the upstanding housing 68 from above for service, removal or replacement. Overlapping of the areas for the lift cylinder device 26 and the upstanding housing 68 for the batteries longitudinally helps to reduce the length while also reducing the width of the power head 15, especially with respect to the spacing between the load lift frame 16 and the base frame 20. This results in improved maneuverability of the pallet truck 10 in tight confines.

The pallet truck 10 further includes a steering assembly 71 that includes a base member 75 and a handle assembly 72 having a control head 73 at its distal or upper end. The handle assembly 72 is pivotally connected to a steering seat 74 by a horizontally disposed pivot pin 76 that connects the handle assembly 72 to the base member 75. The handle assembly 72 may be pivoted about the pivot pin 76 to an appropriate height for a given user. The user then may steer the pallet truck 10 by moving the handle assembly 72 laterally so as to rotate the drive wheel 40 about a vertical steering axis through the steering seat 74. In this manner, the base member 75 of the steering assembly 71 being rotatably coupled to the steering seat 74 about the vertical steering axis permits pivoting of the handle assembly 72 to steer the pallet truck 10 and does not produce concurrent turning of the lift cylinder device 26, contrary to the approach of prior manual and semi-powered pallet trucks. In this example, the full range of turning of the handle assembly 72, and therefore, the drive wheel 40, may be approximately 180 degrees, although the extent of turning may differ, if desired.

The control head 73 on the handle assembly 72 also includes control inputs 78 that are connected to the electronic control system 64. The control inputs 78 on the handle assembly 72 receive commands from an operator and convert the inputs into operation signals for the electronic control system 64. The electronic control system 64 may be of a suitable type for pallet truck operation, and may include components such as a Zapi® brand transistor speed control or the like. In response to signals from the control inputs 78, the electronic control system 64 may send corresponding control signals to the drive motor 42 and/or the hydraulic pump 66 and receive feedback therefrom. For example, an operator may rotate a control input 78 forward to send a signal to the electronic control system 64, which in turn activates the drive motor 42 to rotate the drive wheel 40 to move the pallet truck 10 forward or rearward. The electronic control system 64 activates the drive motor 42 via wires, such as in a wiring harness extending therebetween (not shown). Thus, a user is able to operate the steering assembly 71 of the pallet truck 10 at the control head 73 at the upper end of the handle 72, and may control the steering to turn left or right, the drive motor 42 to move forward or rearward, and the pressurized fluid supply mechanism 62 to actuate the lift cylinder device 26 to raise or lower the load lift portion 12.

The pallet truck 10 has a lower link assembly 80 pivotally connected to the base frame 20 and the load lift frame 16 for controlling movement of the load lift frame 16 relative to the base frame 20. The lower link assembly 80 may be seen in FIGS. 3 and 5-7, and includes a pair of arms 82 connected to a counter-torque tube 84 having flanges 86 extending therefrom that together form a pair of bell cranks 88 disposed on opposite sides of the lift cylinder device 26. Each of the arms 82 lies within a vertical plane but includes a bend along its length. The arms 82 are pivotally connected to the base frame 20 at pins 83 and the counter-torque tube 84 is pivotally connected to the upstanding housing 68 of the load lift portion 12 by being rotatably mounted on a shaft 85 that is rigidly connected to the upstanding housing 68. The counter-torque tube 84 restricts relative movement between the bell cranks 88 and pivots about the shaft 85. In one example, the counter-torque tube 84 is positioned on the shaft 85, with the ends of the shaft 85 being positioned in openings 89 of the upstanding housing 68, where the ends of the shaft 85 may be affixed, such as by welding or other suitable means of connection.

Figure 5:
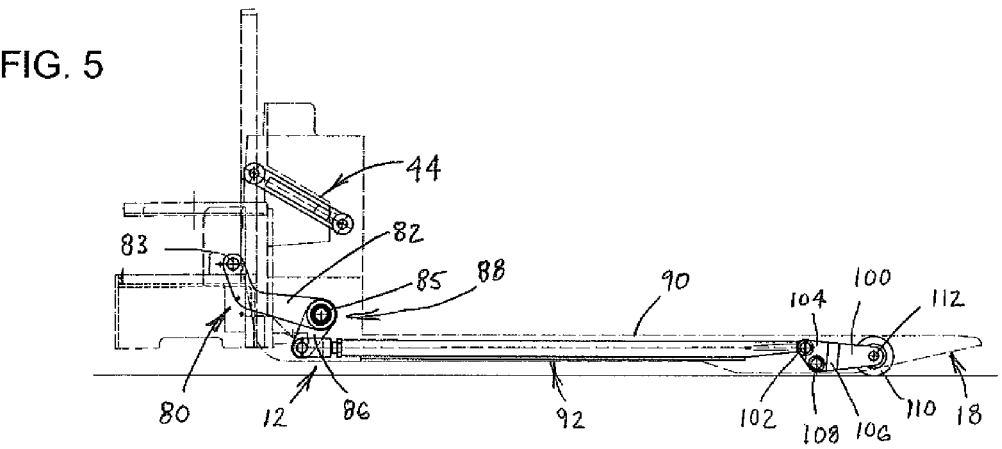
FIG. 5 is a side elevational view showing the linkages and front wheel lifting mechanism of the pallet truck of FIG. 1 relative to the forks when in the fully lowed position.
Figure 6:
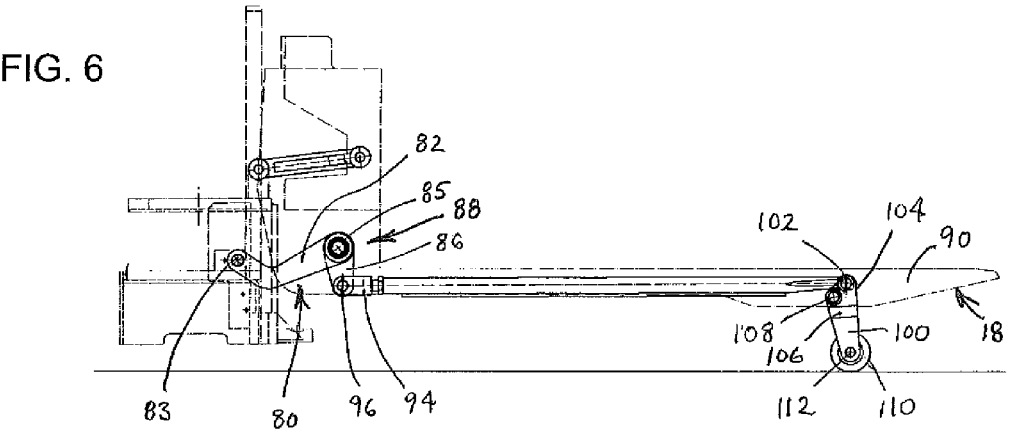
FIG. 6 is a side elevational view showing the linkages and front wheel lifting mechanism of the pallet truck of FIG. 1 relative to the forks when in the fully raised position.

As can be seen when comparing FIGS. 5 and 6, when the load lift portion 12 is moved from the fully lowered position seen in FIG. 5 to the fully raised or elevated position seen in FIG. 6, the pivotal connection of the upper link assembly 44 and lower link assembly 80 between the base frame 20 and the load lift frame 16 forms a four-bar configuration. This four-bar configuration causes the load lift portion 12 to be advanced forward slightly relative to the base support portion 14. Thus, with this example configuration, the load lift portion 12 moves relatively forward as it moves upward and rearward as it moves downward.

Each fork 18 includes a fork housing 90 having a top surface 91 upon which a load may be placed. To raise and lower the distal ends of the forks 18 simultaneously with load lift frame 16, a lift link assembly 92 is provided, as seen in FIGS. 3 and 5-7. The lift link assembly 92 is disposed beneath the fork housing 90 and includes a connector 94 that is pivotally connected at a first end by a pin 96 to the flanges 86 of the bell cranks 88 and is connected at a second end, such as by threaded engagement or other suitable means of connection, to a long link 98 that extends longitudinally beneath the housing 90. At the opposite end of the long link 98 is a wheel bracket 100 that is pivotally connected by a pin 102 at extensions 104 of the wheel bracket 100, while further having a body 106 pivotally connected to the housing 90 by fasteners 108, such as by bolts and/or bushings or the like. The wheel bracket 100 carries a roller or load wheel 110 that is rotatably connected to the wheel bracket 100 by a load wheel pin 112.

It will be appreciated when viewing FIGS. 5 and 6 that when the lift cylinder device 26 raises or lowers the load lift portion 12, the lower link assembly 80 pivots. For instance, when raising the load lift portion 12, the bell crank 88 pivots and moves the lift link assembly 92 forward relative to housing 90. This, in turn, drives the extensions 104 of the wheel bracket 100 forward and over the axis of the pivotal connection of the wheel bracket 100 to the housing 90. This action causes the wheel bracket 100 to pivot the load wheel 110 rearward and underneath the pivotal connection of the wheel bracket 100 to the housing 90, thereby raising the fork 18 at the front end of the pallet truck 10 as the lift cylinder device 26 raises the load lift frame 16 at the rear of the load lift portion 12. A lowering motion of the load lift cylinder 26 reverses the movement, simultaneously lowering the front end of the fork 18 and the load lift frame 16 of the load lift portion 12.

Stated in another way, activating lift cylinder device 26 and raising the upstanding housing 68 upward causes the bell cranks 88 and counter-torque tube 84 to pivot about the shaft 85, which in turn moves the long link 98 forward and pivots wheel bracket 100 about the pins 102 to pivot the load wheel 100 in a direction that raises the forks 18. It will be appreciated that the forks 18 may be of any length and width, or may have a length that is standard to particular applications or industries, such as in the range of approximately 36 inches to approximately 45 inches, with pallet trucks of the present disclosure that have such fork lengths having a corresponding total length being in the range of 55 inches to 64 inches.

With reference to FIG. 4, the base support portion 14 includes a rear housing assembly 114. The rear housing assembly 114 includes an upper rear housing 116 that covers the steering seat 74, and a lower rear housing 118 that covers the drive wheel 40 and drive motor 42. The power head 15 includes a front upper housing 120 that covers the integrated control module 61, the lift mechanism 24, and the open upper end of the upstanding housing 68 and its battery containers 69 that hold the batteries. A power stop button 122 and a retractable cord 124 for the battery charger 63 extend through an opening in the front upper housing 120 for convenient access by an operator.

It will be understood that various changes, modifications, alterations, and combinations in the details, materials, and arrangements of the parts and components that have been described and illustrated in order to explain the nature of the powered pallet truck as described herein may be made by those skilled in the art within the principle and scope of this disclosure.

The invention claimed is:

1. A powered pallet truck comprising:
a base support portion having a base frame and a load lift portion having a load lift frame, the load lift portion further comprising a pair of forks that extend forwardly and a channel having spaced apart side walls that are fixedly connected to a rear wall;
a drive wheel being rotatably connected to the base frame;
a drive motor coupled to the drive wheel;
a lift mechanism operable for moving the load lift portion and the forks thereof up and down relative to the base support portion;
the lift mechanism further comprising a lift cylinder device connected at a first portion to a lift cylinder device seat that extends from the base frame and is disposed forward and below a top of the drive wheel and forward of a rearmost portion of the load lift frame;
the lift cylinder device being pivotally connected at a second portion to the spaced apart side walls of the channel of the load lift frame;
wherein the lift cylinder device is recessed within the channel, forward of the rear wall and forward of the rearmost portion of the load lift frame; and
a pressurized fluid supply mechanism connected to the load lift frame and configured to supply pressurized fluid to the lift cylinder device.

2. The powered pallet truck of claim 1 wherein the first portion of the lift cylinder device is substantially vertically aligned with the second portion of the lift cylinder device.

3. The powered pallet truck of claim 1 wherein the load lift portion further comprises an upstanding housing configured to receive one or more batteries with the pressurized fluid supply mechanism being disposed above the one or more batteries.

4. The powered pallet truck of claim 1 wherein the pressurized fluid supply mechanism includes a pump for supplying pressurized fluid to the lift mechanism.

5. The powered pallet truck of claim 1 further comprising an upper link assembly pivotally connected to the base frame at a first end and pivotally connected to the load lift frame at a second end.

6. The powered pallet truck of claim 5 wherein the upper link assembly is wider at the first end that is pivotally connected to the base frame than at the second end that is pivotally connected to the load lift frame.

7. The powered pallet truck of claim 5 wherein the upper link assembly further comprises a pair of links that are fixedly connected to each other along a length of the links and that have spaced apart first ends and opposed spaced apart second ends, wherein spacing between the first ends is wider than between the second ends.

8. The powered pallet truck of claim 1 further comprising a transmission assembly disposed between the drive motor and the drive wheel.

9. The powered pallet truck of claim 1 wherein the lift mechanism comprises the lift cylinder device having a longitudinal axis aligned with a central longitudinal axis of the load lift frame.

10. The powered pallet truck of claim 1 wherein the drive motor further comprises a permanent magnet motor or a brushless AC motor.

11. A powered pallet truck comprising:
a base support portion having a base frame and a load lift portion having a load lift frame, the load lift portion including a pair of forks that extend forwardly and a channel having spaced apart side walls fixedly connected to a rear wall, and the base support portion including a steering seat, a drive wheel and a drive motor rotatably coupled to the drive wheel;
the base frame further comprising a lift cylinder device seat located forward and below a top of the drive wheel;
a steering assembly rotatably coupled to the steering seat;
a lift cylinder device having an upper portion and a lower portion and being operable to move the load lift portion and the forks thereof up and down relative to the base support portion;
a pivotal connection between the upper portion of the lift cylinder device and the spaced apart side walls of the channel of the load lift frame at a location forward of the rear wall and forward of a rearmost portion of the load lift frame; and
a connection between the lower portion of the lift cylinder device and the lift cylinder device seat of the base frame at a location forward of the drive wheel and the steering seat, and forward of the rearmost portion of the load lift frame.

12. The powered pallet truck of claim 11 wherein the load lift portion further comprises an upstanding housing that includes at least one battery container.

13. The powered pallet truck of claim 12 wherein an integrated control module is removably connected to the load lift frame above the upstanding housing.

14. The powered pallet truck of claim 13 wherein the integrated control module further comprises a pressurized fluid supply mechanism, a battery charger and an electronic control system.

15. The powered pallet truck of claim 13 wherein when the integrated control module is removable so as to access at least one battery in the at least one battery container of the upstanding housing.

16. The powered pallet truck of claim 11 further comprising a handle assembly configured for pivotal movement about the steering seat.

17. The powered pallet truck of claim 11 wherein the base frame and the load lift frame are connected by an upper link assembly and a lower link assembly.

18. The powered pallet truck of claim 17 wherein the upper link assembly is generally Y-shaped and the lower link assembly further comprises a bell crank.

19. The powered pallet truck of claim 17 wherein the upper link assembly further comprises a pair of links that are fixedly connected to each other along a length of the links and that have spaced apart first ends pivotally connected to the base frame and opposed spaced apart second ends pivotally connected to the load lift frame, wherein spacing between the first ends is wider than between the second ends.

* * * * *